Patented June 15, 1926.

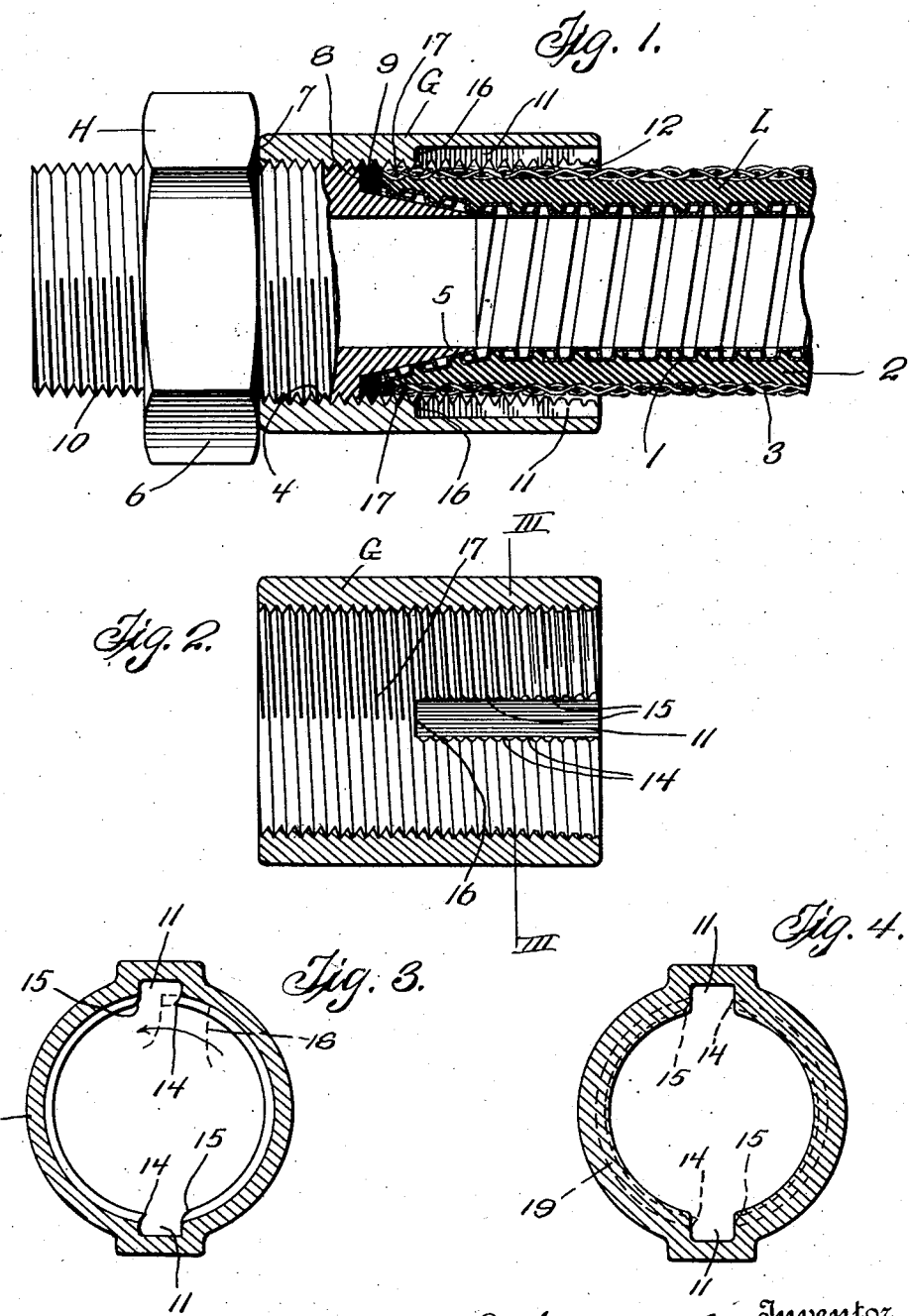

1,588,606

UNITED STATES PATENT OFFICE.

JOHN M. ODEN, OF BROOKLYN, NEW YORK.

METHOD OF MAKING COUPLING SLEEVES.

Original application filed February 16, 1922, Serial No. 536,893. Divided and this application filed January 25, 1926. Serial No. 83,556.

This invention relates to a hose coupling, and particularly to a method of making the sleeve portions of such couplings whereby to facilitate easy and proper application of the sleeve onto the end portion of a piece of hose, in this respect being an improvement upon the structure shown and described in my Patent No. 1,288,148, December 17, 1918, and the present application being a division of my pending application Serial No. 536,893, filed Feb. 16th, 1922.

The coupling illustrated in said mentioned patent, consists of a body member and a sleeve member, the sleeve member being fitted over the end of the hose, and the body member being screwed into a projecting part of the sleeve in such wise that interrotation of the body and sleeve will cause a tapered portion of the body to progress into the hose and thereby wedge the outer surface of the hose into tighter engagement with the inner surface of the sleeve. It has been found in practice that while this structure is eminently efficient, and the parts thereof readily assembled on a hose by the use of proper tools, yet, in instances where proper tools are not available, then the assembly of the parts, and particularly of the sleeve into its position over the hose, presents serious problems, and some times results in inficient assembly.

If the sleeve can be gotten to its appointed place upon the hose, then the remainder of the assembling operation is relatively simple and may be performed with uniform efficiency, and it is, therefore, important to provide means for facilitating the easy and correct assembly of the sleeve on to the hose. Such a means is shown and described in the present application of which this is a division and the purpose of the present invention is to provide an improved method of process by which to produce the device shown in said pending application.

In the accompanying drawings which are to be taken as a part of this specification, and in which I have shown merely a preferred form of embodiment of the invention:

Fig. 1 is a longitudinal sectional view thru a coupling constructed in accordance with this invention and showing the same applied to a piece of hose as in use.

Fig. 2 is a longitudinal sectional view of the sleeve detached,

Fig. 3 is a transverse sectional view upon the plane of line III of Fig. 2, and

Fig. 4 is a sectional view similar to that seen in Fig. 3 showing in full lines the condition of the sleeve prior to the formation of the threads therein and showing in dotted lines the position of the threads.

Referring to the drawings for describing in detail the structure which is therein illustrated, the reference character L indicates the hose over the end portion of which, as seen in Fig. 1, fits the sleeve G and into this is threaded the body H.

The hose illustrated is commercially known as "triplexd" hose, being formed of an inner lining 1 of metal, a filler 2 of rubber, or composition, and an outer casing, or cover 3, of woven canvas, or the like. The metal lining, 1 may be formed in any appropriate manner but, as indicated, consists of spirally wound strip material so as to render the hose easily flexible, in a manner well known in this art.

The sleeve G is screw threaded interiorly and is of a size to fit snugly over the outer surface of the hose L, the threads of the sleeve engaging the multitudinous protuberances formed by the weave of the canvas cover of the hose.

The sleeve is arranged so that it projects somewhat beyond the end of the hose.

The body H is formed with an externally threaded portion 4, arranged to engage the threads of the extending portion of the sleeve. A tapered extension 5 is formed beyond the portion 4 adapted to be forced into the end of the hose by which action it will in turn operate to spread the end portion of the hose and to thereby clamp the material of the hose tightly against the inner surface of the sleeve.

A nut shaped portion 6 is provided for rotating the body, said portion constituting a shoulder 7 for engaging the adjacent end of the sleeve to limit inward movement of the body.

A further shoulder, as 8, is provided at the larger end of the tapered portion 5, and preferably a gasket, as 9, of felt, leather, or the like, is interposed between said shoulder and the adjacent end of the hose where it will be tightly compressed when the body is screwed home. As the cavity within which this gasket is contained grows smaller as the body is screwed home, the pressure upon the gasket will be so great as to force portions of the gasket into the small interstices which inevitably occur between the parts of the device forming the cavity so that these interstices are effectually sealed against possible passage of fluid outwardly from within the hose.

If desired the gasket may be impregnated with a suitable sealing material, as shellac, or other appropriate gum, or the like, a portion of which material will naturally be squeezed from the gasket and into the mentioned interstices where it will form a more effectual seal against possible passage of fluid from within the hose.

At the opposite side of the nut portion 6, an extension 10 is provided by means of which connection may be made with any desired object. This extension may be threaded either internally or exteriorly, or may take any appropriate form according to requirements.

In attaching the coupling to the hose, the sleeve G is first screwed on to the hose to a position substantially as indicated. The body H is then introduced and screwed into the sleeve. Necessary force is applied to the sleeve and body to continue inward movement of the body preferably until the sleeve comes to rest against shoulder 7 during which time the portion 5 is advanced into the hose so as to exert a bursting force upon the hose which is resisted by the sleeve. The result is that the end portion of the hose is clamped and squeezed tightly between the tapered portion 5 and the interior surface of the sleeve, the material of the hose being forced into the threads of the sleeve under a powerful pressure. The gasket 9 will, at the same time, be confined and compressed in a manner and with a result as already referred to.

Engagement of the threads of the sleeve with the material of the hose prevents any creeping action of the sleeve along the hose during the inward movement of the body.

It is noted that the coarse cover 3 of the hose by its character and surface formation, provides an excellent medium for gripping the threads of the sleeve, that the metallic lining 1 of the hose serves to maintain unchanged the interior diameter of the hose during application of the sleeve G thereover, and provides an excellent surface for frictional cooperation with the tapered portion 5 of the body, and that the rubber, or other elastic filler 2 of the hose provides an ideal material to receive and transmit the compression force incident to movement of the tapered portion 5 into the hose.

In order that the sleeve G may have a sufficient grip upon the hose to enable it to withstand the pull of the body when the body is being screwed home, it is necessary that the relative sizes of the sleeve and hose shall be such that the sleeve shall have a very tight fit over the hose. On this account it follows that as heretofore constructed efficient tools were required to grip the hose and sleeve and to force the sleeve on to the hose.

As herein illustrated, however, it is proposed that the sleeve be made to comprise means for at least partially cutting its way on to the hose, thus making interrotation of the sleeve and hose more easily accomplished and rendering the use of tools not essential. As illustrated in the drawings, this means consists in forming within the sleeve one or more slots 11 which extend longitudinally of the sleeve and transverse to the threads of the sleeve and of tapering off the threads toward the inner end of the sleeve, as indicated at 12.

According to the present method the slots 11 are cut into the sleeve prior to the cutting of the threads, since by this method of procedure burrs formed by the thread cutting tool as said tool enters the slot will constitute thread cutting points, as indicated at 14, upon the end of the threads, said cutting points being dragged, or flared, so as to overhang and project into the slots in acute angular relationship to the apexes of the threads so that when the sleeve is being rotated on to a hose they will, to a desirable extent, cut their way thru the material of the cover 3 of the hose, thus reducing the amount of power required for rotating the sleeve on to the hose.

By cutting away, or tapering the threads at the inner end of the sleeve, as indicated at 12, a gradual cutting of the cover 3 by the burrs, or points, 14, is provided for so that correspondingly greater ease of application of the sleeve is accomplished.

By cutting the threads after the slots are formed the corners 15 of the threads opposite the cutting corners 14, are pressed backwardly by the thread cutting tool so that said corners are more or less rounded and in use will operate to permit of retrogressive passage of said threads thru the threads of the cover 3, formed by the corners 14, whenever, for any reason, it is desired to remove the sleeve from the hose.

By these means it is apparent that the efficiency of grip between the sleeve and the hose will not be impaired notwithstanding the fact that greater ease of application and removal is afforded.

The length of the slot 11 is such that its end, as 16, terminates short of the gasket 9 so as thus to leave an uninterrupted portion, as 17, of the threads of the sleeve lapping the hose between the gasket and the end 16. This arrangement prevents any undue displacement of the gasket material into, or thru, the slots 11, which displacement might detract from the efficiency of the seal.

It will be understood that by the use of the word "cut", or "cutting", for describing the thread-way forming means provided in the sleeve is meant a means which will actually cut or tear its way through the material of the hose cover so as to make way for the following portions of the threads when the sleeve is being rotated on to the hose, as distinguished from the simple squeezing or embedding result attained by the use of the smooth uninterrupted threads illustrated in my Patent No. 1,288,148 referred to.

As many changes could be made in this construction without departing from the scope of the invention as defined in the following claim, it is intended that all matter contained in the above description or shown in the accompanying drawings, shall be interpreted as illustrative only and not in a limiting sense.

In the illustration Fig. 4 I have shown the condition of the sleeve as it appears prior to the formation of the threads, from which it will be seen that the slots 11 appear therein and that in shaving off the material, in forming the threads, the tool, indicated by the reference character 18, will drag the metal at opposite sides of the slots and thereby form the cutting points 14 and the rounded corners 15.

The finished threads are illustrated by dotted lines 19 in Fig. 4.

Having thus described my invention, what I claim as new and desire to secure by Letters Patent is:—

The herein described method of forming a threaded hose coupling sleeve having cutting edges upon the threads thereof, which method consists in providing a groove within the sleeve extending longitudinally thereof, and then cutting the interior surface of the sleeve with a suitable tool to form threads within the sleeve thereby dragging end portions of the threads and forming cutting edges upon the threads overhanging the groove at one side of the groove and forming rounded edges upon the threads at the opposite side of the groove.

In testimony whereof I affix my signature.

JOHN M. ODEN.